US009558730B2

(12) United States Patent
Tsai et al.

(10) Patent No.: US 9,558,730 B2
(45) Date of Patent: Jan. 31, 2017

(54) AUDIO SIGNAL PROCESSING SYSTEM

(71) Applicant: National Central University, Jhongli, Taoyuan County (TW)

(72) Inventors: Tsung-Han Tsai, Taoyuan (TW); Pei-Yun Liu, Taipei (TW); Yu-He Chiou, Yilan County (TW)

(73) Assignee: NATIONAL CENTRAL UNIVERSITY, Jhongli, Taoyuan County (TW)

( * ) Notice: Subject to any disclaimer, the term of this patent is extended or adjusted under 35 U.S.C. 154(b) by 0 days.

(21) Appl. No.: 14/736,069

(22) Filed: Jun. 10, 2015

(65) Prior Publication Data

US 2016/0307554 A1 Oct. 20, 2016

(30) Foreign Application Priority Data

Apr. 15, 2015 (TW) ............................. 104112050 A

(51) Int. Cl.

| | |
|---|---|
| ***H04B 15/00*** | (2006.01) |
| ***G10K 11/16*** | (2006.01) |
| ***G10L 21/0232*** | (2013.01) |
| ***G10K 11/175*** | (2006.01) |
| ***H04R 3/00*** | (2006.01) |
| *G10L 21/0208* | (2013.01) |
| *G10L 21/0216* | (2013.01) |

(52) U.S. Cl.
CPC ............. *G10K 11/16* (2013.01); *G10K 11/175* (2013.01); *G10L 21/0232* (2013.01); *H04R 3/005* (2013.01); *G10L 21/0208* (2013.01); *G10L 2021/02165* (2013.01)

(58) Field of Classification Search
CPC ....... G10K 11/16; G10K 11/175; H04R 3/005; G10L 21/0208; G10L 2021/02165; G10L 21/0232
See application file for complete search history.

(56) References Cited

U.S. PATENT DOCUMENTS

| | | | | |
|---|---|---|---|---|
| 7,003,099 B1 * | 2/2006 | Zhang | ................... | H04M 9/082 379/388.02 |
| 2015/0078571 A1 * | 3/2015 | Kurylo | ................. | G10K 11/178 381/71.8 |
| 2016/0134984 A1 * | 5/2016 | Erkelens | ............. | H04R 29/004 381/56 |

* cited by examiner

*Primary Examiner* — Andrew L Sniezek
(74) *Attorney, Agent, or Firm* — Muncy, Geissler, Olds & Lowe, P.C.

(57) ABSTRACT

An audio processing system includes an audio receiving module, a sound source separation module and a noise suppression module. The audio receiving module receives at least two audio signals. The sound source separation module receives a plurality of space features of the audio signals and obtains a main sound source signal separated from the audio signals based on the space features. The noise suppression module processes the main sound source signal based on an averaged amplitude value of noise in the main sound source signal so as to suppress noise in the main sound source signal. Each audio signal of the at least two audio signals includes signals from a plurality of sound sources.

12 Claims, 5 Drawing Sheets

AUDIO SIGNAL PROCESSING SYSTEM

BACKGROUND OF THE INVENTION

1. Field of the Invention

The present invention relates to an audio processing system and, more particularly, to an audio processing system for eliminating noise.

2. Description of Related Art

Recently, with the fast development of multimedia techniques, the functions of smart phone, such as video recording or voice recording, are getting more and more powerful, and the requirement for recording voice or video is also greatly increased. However, when a user records voice in an actual application, due to the background circumstance, some additional noises, for example human voice in the background, may appear in the voice recorded by the user, resulting in that the quality of the voice recording is low. Besides, because the use of mobile phone is so popular, users often perform speech communication via the mobile phones when they are moving. However, the quality of such speech communication may be low due to the background noises, and this problem becomes more serious when the hand-free function of mobile phone is used.

For example, it is very dangerous for a driver to use a mobile phone when driving a car, and thus the hand-free function becomes indispensable to the driver. However, the hand-free function is likely to be influenced by lots of background noises, for example, roadwork sound and car horn sound, which may reduce the quality of phone call or even distract the driver's attention, resulting in traffic accidents.

Therefore, there is a need to provide an improved audio processing system, which can effectively suppress background noises and thus provide a better audio signal quality.

SUMMARY OF THE INVENTION

An object of the present invention is to provide an audio processing system for eliminating noise in audio signals, which comprises: an audio receiving module for receiving at least two audio signals; a sound source separation module for receiving a plurality of space features of the audio signals and obtaining a main sound source signal separated from the audio signals based on the space features; a noise suppression module for processing the main sound source signal based on an averaged amplitude value of noise in the main sound source signal so as to suppress noise in the main sound source signal; wherein each audio signal of the at least two audio signals includes signals from a plurality of sound sources. Thus, the system can separate a plurality of sound sources from the audio signals, and process each separated sound source based on noise level in each separated sound source to further suppress noise in each separated sound source.

Another object of the present invention is to provide an audio processing method performed on an audio processing system for eliminating noise in audio signals. The method comprises the steps of: (A) receiving at least two audio signals, each including signals from a plurality of sound sources; (B) receiving a plurality of space features of the audio signals, and separating a main sound source signal from the audio signals based on the space features; and (C) processing the main sound source signal based on an averaged amplitude value of noise in the main sound source signal so as to suppress noise in the main sound source signal. Thus, the system executes the method to separate a plurality of sound sources from the audio signals, and to process each separated sound source based on noise level in each separated sound source for further suppressing noise in each separated sound source.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
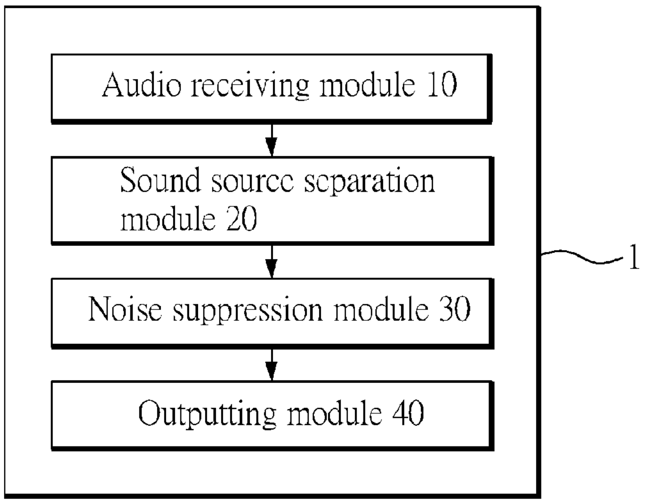
FIG. 1 is a schematic diagram illustrating the structure of an audio processing system according to the present invention.

FIG. 1 is a schematic diagram illustrating the structure of an audio processing system 1 according to a preferred embodiment of the present invention. As shown, the audio processing system 1 includes an audio receiving module 10, a sound source separation module 20, a noise suppression module 30 and an outputting module 40. In this embodiment, the audio processing system 1 is implemented in a computer device connected to external hardware devices for controlling the hardware devices by using the aforementioned modules. Alternatively, the audio processing module 1 can be implemented as a computer program installed in a computer device, so that the computer device can be provided with the functions of the aforementioned modules. It is noted that the computer device described herein is not limited to a personal computer, while it can be any hardware device with micro-processor function, for example, a smart phone device.

The audio receiving module 10 is used to receive audio signals from the outside. For example, the audio receiving module 10 receives audio signals through an external microphone, and transmits the received audio signals to other modules of the audio processing system 1 for further processing. More specifically, the audio receiving module 10 can receive audio signals through a plurality of microphones, and the microphones can be disposed on different positions for receiving audio signals, respectively. Thus, the audio receiving module 10 can receive a plurality of audio signals; i.e., a plurality of audio signals can be inputted to the audio processing system 1. Besides, audio signal received by each microphone may include voices from a plurality of sound sources; for example, when a user drives a car and uses the hand-free function of a mobile phone, the microphone of the mobile phone may receive voice of the user and a plurality of background noises.

Figure 2:
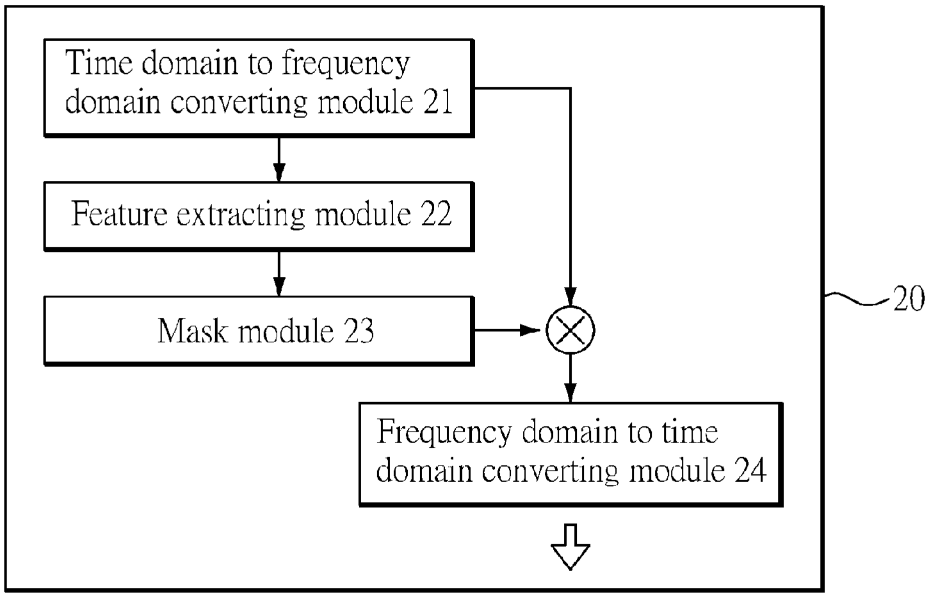
FIG. 2 is a detailed structure diagram of a sound source separation module of the audio processing system.

FIG. 2 is a detailed structure diagram of the sound source separation module 20. As shown, the sound source separation module 20 includes a time domain to frequency domain converting module 21, a feature extracting module 22, a mask module 23 and a frequency domain to time domain converting module 24. The sound source separation module 20 is used to separate the signal of each sound source form the audio signals, and obtain the signal of a main sound source. First, the sound source separation module 20 obtains a plurality of space features from the plurality of audio signals and identifies a plurality of sound sources based on the space features, and then applies binary mask technique to one of the audio signals so as to separate a plurality of sound source signals form the audio signal, thereby obtaining a main sound source signal without background noises. The detailed operations of the aforementioned modules for sound source separation will be described hereinafter.

Figure 3:
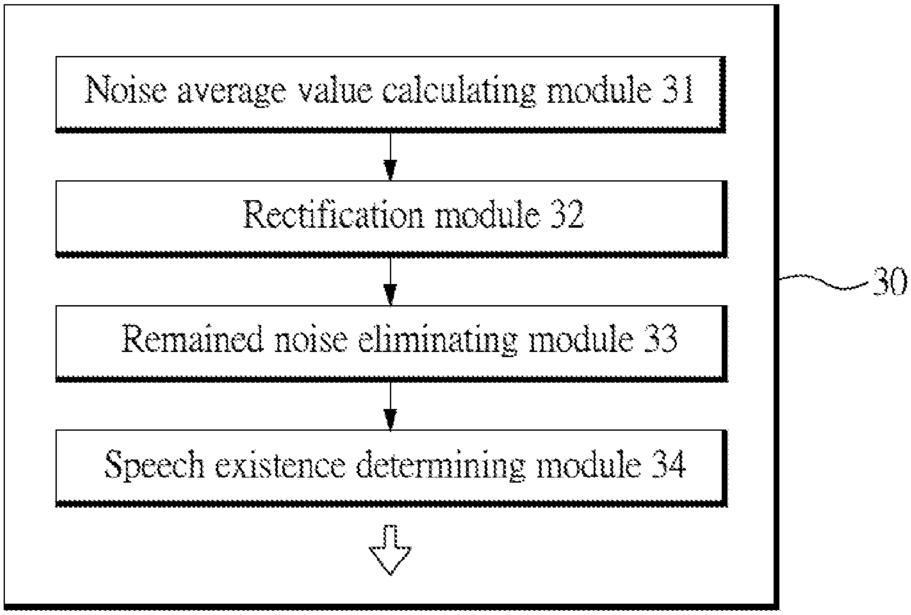
FIG. 3 is a detailed structure diagram of a noise suppression module of the audio processing system.

FIG. 3 is a detailed structure diagram of the noise suppression module 30. As shown, the noise suppression module 30 at least includes a noise average value calculating module 31 and a rectification module 32. In addition, the noise suppression module 30 may further include a remained noise eliminating module 33 and a speech existence determining module 34. The noise suppression module 30 is used to suppress noise in the main sound source signal, so as to improve the quality of the main sound source signal. The noise suppression module 30 first receives an amplitude average value of the noise in the main sound source signal, and then processes the main sound source signal based on the amplitude average value, so as to further suppress the noise. Finally, the audio processing system 1 uses the outputting module 40 to output the main sound source signal with suppressed noise. The detailed operations of the aforementioned modules for noise suppression will be described hereinafter.

Figure 4:
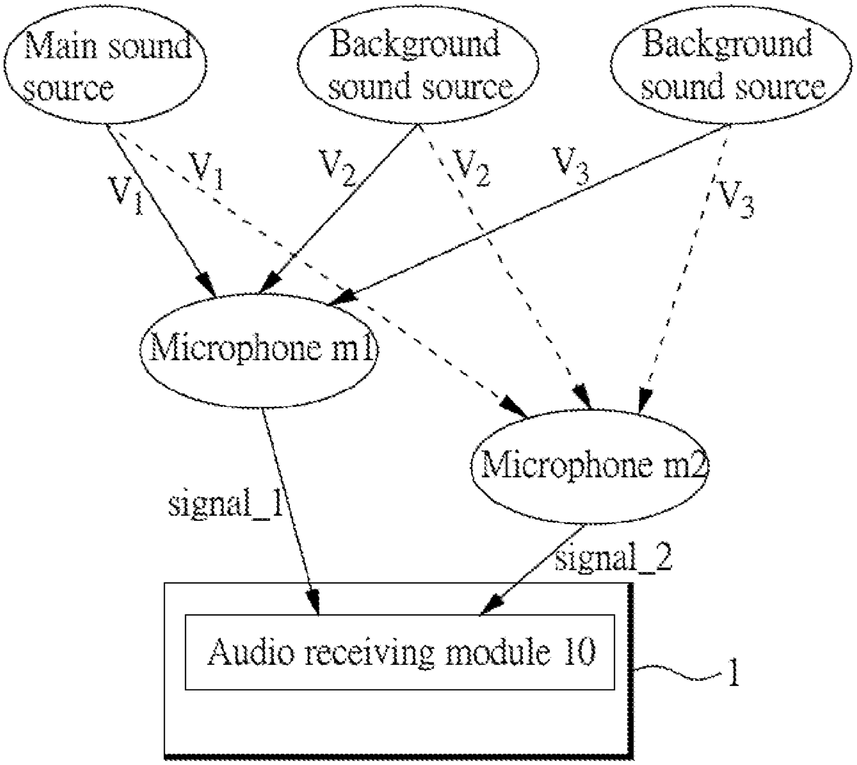
FIG. 4 schematically illustrates an operation situation of the audio processing system according to a preferred embodiment of the present invention.

FIG. 4 schematically illustrates an operation situation of the audio processing system 1 according to a preferred embodiment of the present invention. For clear description, operation situations of the sound source separation module 20 and the noise suppression module 30 are also depicted by using this embodiment hereinafter. In this embodiment, the audio processing system 1 receives two audio signals via two microphones m1 and m2. The microphones m1 and m2 are used to receive an original signal v1 from a main sound source and background signals v2 and v3 from two background sound sources. Because the microphones m1 and m2 are disposed at different positions, the time point for the microphone m1 to receive the main sound source signal v1 is different from the time point for the microphone m2 to receive the signal v1. Similarly, the time points for the microphones m1 and m2 to receive the background signals v2 and v3 are different from each other. Therefore, the microphones m1 and m2 will receive audio signals signal_1 and signal_2, respectively, wherein each of the audio signals signal_1 and signal_2 is mixed with components of the signals v1, v2 and v3, but the time points corresponding to the components of the signals v1, v2 and v3 mixed the two signals signal_1 and signal_2 are different. The audio receiving module 10 receives the audio signals signal_1 and signal_2 through the microphones m1 and m2, so that the audio signals signal_1 and signal_2 are inputted to the audio processing system 1 for further processing. It is noted that the numbers of audio signals, microphones, and sound sources as described in this embodiment are for illustrative purpose only. In actual application, the audio processing system 1 may receive more audio signals via more microphones, and the number of the sound sources can be more than two. Preferably, the number of the microphones are at least two, due to that it is hard to identify the configuration of sound source signals v1, v2 and v3 from only one audio signal. Besides, the sound source signals v1, v2 and v3 are preferred to be time domain signals.

Figure 5:
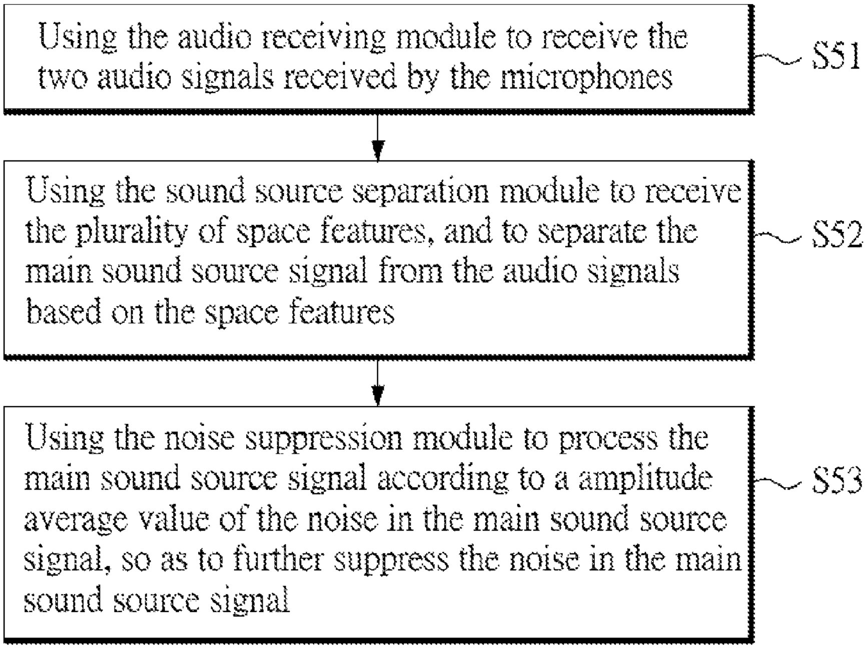
FIG. 5 is the flow chart of an audio processing method according to a preferred embodiment of the present invention.

FIG. 5 is the flow chart of an audio processing method executed by the audio processing system 1 according to a preferred embodiment of the present invention. With reference to FIG. 5 as well as FIG. 1 and FIG. 4, step S51 is first executed, in which the audio receiving module 10 is used to receive the two audio signals signal_1 and signal_2 received by the microphones m1 and m2, wherein each of the audio signals signal_1 and signal_2 is mixed with the main sound source signal v1 in time domain and the two background sound source signals v2 and v3 in time domain. Next, step S52 is executed, in which the sound source separation module 20 is used to receive the plurality of space features, and separate the main sound source signal v1' from the audio signals based on the space features. Then, step S53 is executed, in which the noise suppression module 30 is used to process the main sound source signal v1' according to an amplitude average value of the noise in the main sound source signal v1', so as to further suppress the noise in the main sound source signal v1'.

Figure 6:
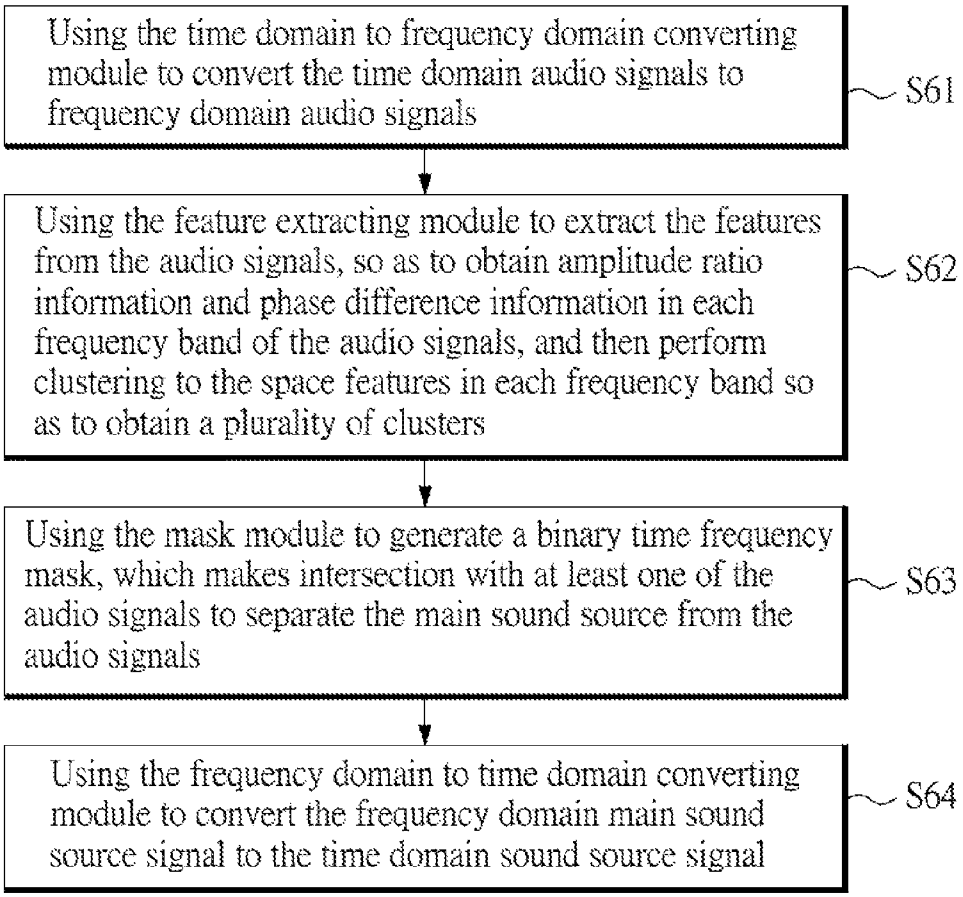
FIG. 6 is a detailed flow chart of step S52 in FIG. 5.

FIG. 6 is a detailed flow chart of step S52 in FIG. 5, which illustrates the detailed operation of the sound source separation module 20. With reference to FIG. 6 as well as FIGS. 2, 4 and 5, step S61 is first executed, in which the time domain to frequency domain converting module 21 is used to convert the time domain audio signals signal_1 and signal_2 to frequency domain audio signals signal_1(*f*) and signal_2(*f*). The time domain to frequency domain converting module 21 is preferably a Fourier transform module, more preferably a short-time Fourier transform module, for dividing one audio signal into a plurality of frames based on a short time, wherein the short time is preferred to be 70 microseconds. Then, each frame is performed with Fourier transform, so that the frequency domain signals signal_1(*f*) and signal_2(*f*) obtained from the transformations can be more stable, wherein each of the signals signal_1(*f*) and signal_2(*f*) includes a plurality of frequency bands.

Then, step S62 is executed, in which the feature extracting module 22 is used to extract the features from the audio signals signal_1(*f*) and signal_2(*f*), so as to obtain amplitude ratio information and phase difference information in each frequency band of the audio signals signal_1(*f*) and signal_2(*f*), and the amplitude ratio information and the phase difference information are then used as the space features. Subsequently, the feature extracting module 22 makes use of K-Means algorithm to perform clustering to the space features in each frequency band, so as to obtain a plurality of clusters with similar space features from the audio signals signal_1(*f*) and signal_2(*f*), wherein each cluster represents one sound source signal. In this embodiment, the audio signals signal_1 and signal_2 are composed by mixing three sound source signals v1, v2 and v3, and thus three clusters can be obtained.

Then, step S63 is executed, in which the mask module 23 is used to generate a binary time frequency mask based on the space features of the cluster of the main sound source signal. The binary time frequency mask makes an intersection with the space features in each frequency band of at least one of the audio signals to remove the cluster without the satisfied space feature, so as to maintain the cluster of the main sound source, thereby forming the main sound source signal v1'. The feature extracting module 22 and the mask module 23 can analyze components of the space features, and determines the cluster of the main sound source based on a predetermined condition. For example, for a mobile phone, the predetermined condition for determining the cluster of the main sound source is to find the cluster with bigger amplitude and stable signal, or to determine the cluster according to the distance between the sound source of a user and the mobile phone, or allow the user to select the cluster of the main sound source from the space features of each cluster displayed by the audio processing system 1.

Then, step S64 is executed, in which the frequency domain to time domain converting module 24 is used to convert the frequency domain main sound source signal v1' to the time domain sound source signal v1, wherein the frequency domain to time domain converting module 24 and the time domain to frequency domain converting module 21 can be implemented in the same module. As a result, the audio processing system 1 can remove the background sound source signals v2 and v3.

Figure 7:
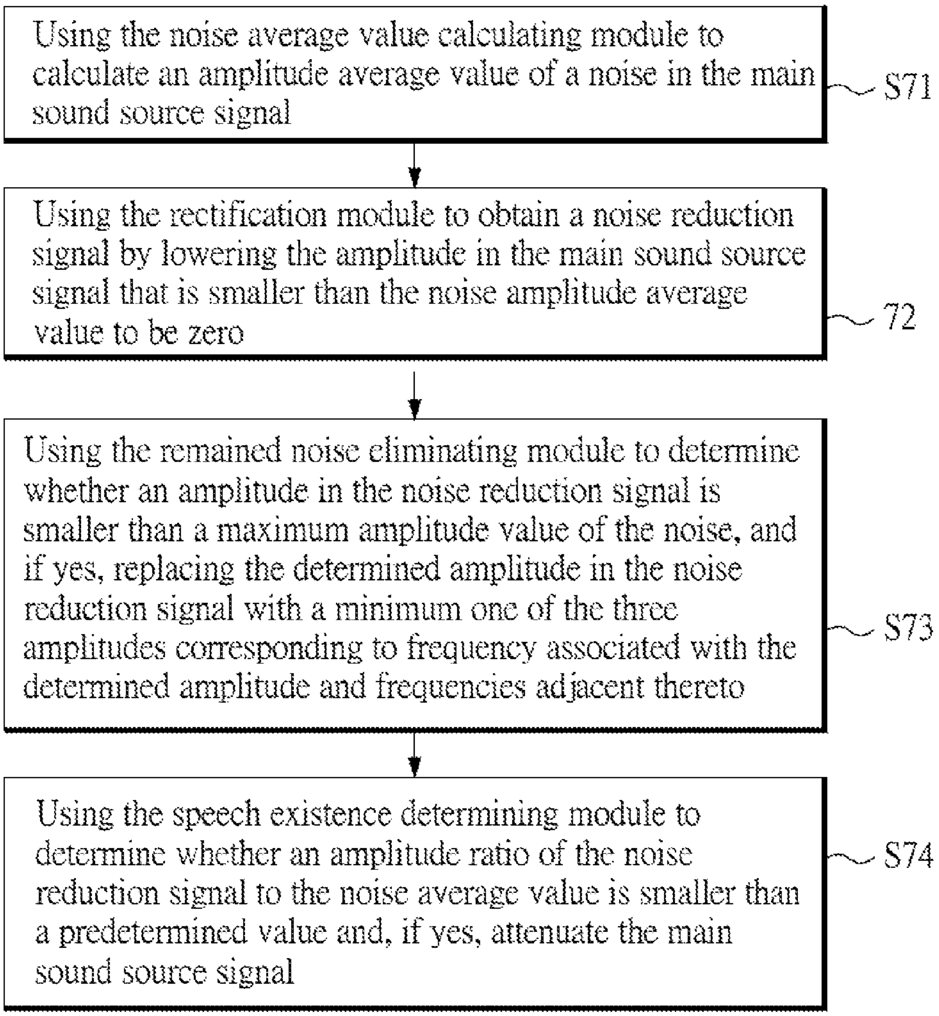
FIG. 7 is a detailed flow chart of step S53 in FIG. 5.

FIG. 7 is a detailed flow chart of step S53 in FIG. 5, which describes the detailed operation of the noise suppression module 30. With reference to FIG. 7 as well as FIGS. 3, 4, 5 and 6, step S71 is first executed, in which the noise average value calculating module 31 is used to calculate an amplitude average value $N_{avg}$ of a noise in the main sound source signal v1'. The noise suppression module 30 can further include a time domain to frequency domain converting module for converting the time domain main sound source signal v1 to the frequency domain main sound source signal v1'. Alternatively, the noise suppression module 30 can also obtain the frequency domain main sound source signal v1' directly from the sound source separation module 20; i.e., step S64 is not executed. Besides, the noise is set to be a signal within a short period of time at the beginning of the time domain main sound source signal v1, preferably within 0.3 second, due to that, when the microphone receives voice, instead of immediately receiving main voice, it usually receives the main voice after a delayed short period of time. For example, there is a short time interval from answering a phone call to starting to speak, in which there is no speech existed, but there are background voices existed to influence the quality of the phone call, which are equivalent to noise of this phone call. Therefore, the quality of the phone call can be improved by removing the noise. Accordingly, the noise average value calculating module 31 calculates an amplitude average value of the time domain main sound source signal v1 for a 0.3 second period at the beginning thereof, which is used as the average value of the noise. It is noted that the 0.3 second noise is extracted for being converted to frequency domain signal before the main sound source signal is converted.

Then, step S72 is executed, in which the rectification module 32 is used to lower the amplitude in the main sound source signal v1' that is smaller than the noise amplitude average value to be zero thereby obtaining a noise reduction signal v1", wherein the noise reduction signal v1" is expressed as $$S(e^{jw}) = X(e^{jw})\left(\frac{\left(1-\frac{N_{avg}}{x(e^{jw})}\right)+\left|\left(1-\frac{N_{avg}}{x(e^{jw})}\right)\right|}{2}\right),$$

wherein $S(e^{jw})$ represents the noise reduction signal v1", $X(e^{jw})$ represents the main sound source signal v1', and $N_{avg}$ represents the noise amplitude average value. Thus, the amplitude in the main sound source signal v1' that is smaller than the noise amplitude average value is lowered to zero.

Due to that the noise suppressed in step S72 is such noise with amplitude being smaller than the noise average value, there are still some remained noises with amplitudes bigger than the noise average value. Therefore, step S73 is executed to use the remained noise eliminating module 33 to determine whether an amplitude in each frequency band of the noise reduction signal v1" is smaller than the maximum amplitude value $N_{max}$ of the noise, wherein the maximum amplitude value $N_{max}$ is a maximum amplitude value within 0.3 second period at the beginning of the time domain main sound source signal v1. If the amplitude in the frequency band is smaller than the maximum amplitude value $N_{max}$, the determined amplitude in the noise reduction signal v1" is replaced with a minimum one of the three amplitudes corresponding to frequency associated with the determined amplitude and frequencies adjacent thereto. Thus, the noises with higher amplitude can be eliminated, and the continuity of real speech can be kept, wherein the aforementioned operation can be expressed as:

$$S(e^{jw})' = \begin{cases} S(e^{jw}), \text{ if } S(e^{jw}) \geq N_{max}; \\ \min\{S(e^{jw}) \mid j = j-1,\ j,\ j+1\}, \text{ if } S(e^{jw}) \geq N_{max}, \end{cases}$$

wherein $S(e^{jw})'$ represents the noise reduction signal without remained noise, and $N_{max}$ represents the maximum amplitude value of the noise.

In addition, because real speech in an audio signal may be discontinuous, for example there usually being some conversation pauses in a phone call, the user may listen to some un-removed noises in the conversation pauses. Thus, a mechanism is required to determine whether actual speech is existed and to perform another noise eliminating method for the frequency band with no speech existed. Accordingly, step S74 is further executed, in which the speech existence determining module 45 is used to determine whether an amplitude ratio of the noise reduction signal v1" to the noise average value $N_{avg}$ is smaller than a predetermined value T. If the amplitude ratio is smaller than the predetermined value T, it indicates that there is no actual speech in the frequency band and thus the speech existence determining module 45 attenuates the min sound source signal corresponding to the frequency band, wherein the attenuation is preferred to be 30 dB and the predetermined value T is preferred to be 12 dB. Thus, the noise reduction signal v1' can further suppress noise for providing an excellent speech quality.

Furthermore, when executing step S72, some mistakes in continuity may be generated due to each frequency band being separately processed. Therefore, an average value operation can be performed to the amplitude of the main sound source signal v1' and the amplitudes adjacent thereto, so as to reduce the mistakes in frequency spectrum, wherein the operation can be expressed as:

$$Xavg(e^{jw}) = \frac{1}{M}\sum_{k=0}^{M-1} X_k(e^{jw}),$$

wherein k represents a current frequency band to be calculated, $X_k(e^{jw})$ represents the main sound source signal v1', M is the number adjacent frequency bands, and $Xavg(e^{jw})$ represents the main sound source signal with reduced mistakes in frequency spectrum. Thus, the main sound source signal of steps S71 to S73 can be replaced by the main sound source signal with reduced mistakes in frequency spectrum, thereby reducing the mistakes in time/frequency domain conversion.

In addition, those skilled in the art can understand that the sequence of executing steps S72 to S74 can be varied or some of the steps can be neglected, and can be aware of the difference of the result obtained therefrom.

In view of the foregoing, it is known that, in the present invention, the sound source separation module 20 of the audio processing system 1 can be employed to remove the background voices and obtain the signal of the main sound source, and the noise suppression module 30 of the audio processing system 1 can be employed to suppress the noise in the main sound source. For example, when a user drives a car and uses the hand-free function of a mobile phone with the audio processing system 1 in accordance with the present invention, the audio separation module 20 can first remove background voices beyond the main speech, and the noise suppression module 30 can further suppress the noise in the main speech, so as to significantly improve the quality of the phone call.

Although the present invention has been explained in relation to its preferred embodiment, it is to be understood that many other possible modifications and variations can be made without departing from the spirit and scope of the invention as hereinafter claimed.

What is claimed is:

1. An audio processing system for eliminating noise in audio signals, comprising:

an audio receiving module for receiving at least two audio signals;

a sound source separation module for receiving a plurality of space features of the audio signals and obtaining a main sound source signal separated from the audio signals based on the space features; and a noise suppression module for processing the main sound source signal based on an averaged amplitude value of noise in the main sound source signal so as to suppress noise in the main sound source signal;

wherein each audio signal of the at least two audio signals includes signals from a plurality of sound sources;

wherein the noise suppression module includes:

a noise average value calculating module for calculating an amplitude average value of the noise in the main sound source signal; and a rectification module for obtaining a noise reduction signal by lowering the amplitude in the main sound source signal that is smaller than the amplitude average value to be zero.

2. The audio processing system of claim 1, wherein at the sound source separation module includes a time domain to frequency domain converting module for converting the at least two audio signals into frequency domain signals; and a feature extracting module for extracting features of the frequency domain signals so as to obtain phase difference information and amplitude ratio information of the at least two audio signals, which are set as the space features.

3. The audio processing system of claim 2, wherein the sound source separation module further includes a mask module for generating at least a binary time frequency mask based on the space features, in which the binary time frequency mask is multiplied by the frequency domain signals to separate the main sound source signal from the frequency domain signals; and a frequency domain to time domain converting module for converting the separated main sound source signal into time domain signal.

4. The audio processing system of claim 1, wherein the noise is a signal in a starting time period of the main sound source signal.

5. The audio processing system of claim 4, wherein the noise suppression module further includes a remained noise eliminating module for determining whether each amplitude in the noise reduction signal is smaller than a maximum amplitude value of the noise and, if yes, replacing the determined amplitude in the noise reduction signal with a minimum one of the three amplitudes corresponding to frequency associated with the determined amplitude and frequencies adjacent thereto.

6. The audio processing system of claim 4, wherein the noise suppression module further includes a speech existence determining module for determining whether an amplitude ratio of the noise reduction signal to the noise is smaller than a predetermined value and, if yes, attenuating the main sound source signal.

7. An audio processing method performed on an audio processing system for eliminating noise in audio signals, the method comprising the steps of:

(A) receiving at least two audio signals, each including signals from a plurality of sound sources;

(B) receiving a plurality of space features of the audio signals, and separating a main sound source signal from the audio signals based on the space features; and (C) processing the main sound source signal based on an averaged amplitude value of noise in the main sound source signal so as to suppress noise in the main sound source signal;

wherein step (C) further includes the steps of:

(C1) calculating the amplitude average value of the noise in the main sound source signal; and (C2) obtaining a noise reduction signal by lowering the amplitude in the main sound source signal that is smaller than the amplitude average value to be zero.

8. The audio processing method of claim 7, wherein step (B) further includes the steps of:

(B1) converting the audio signals into frequency domain signals; and (B2) extracting features of the frequency domain signals to obtain phase difference information and amplitude ratio information of the at least two audio signals and setting the phase difference information and the amplitude ratio information as the space features.

9. The audio processing method of claim 8, further comprising, after step (B2), the steps of:

(B3) generating at least a binary time frequency mask according to the space features, and multiplying the binary time frequency mask by the frequency domain signals to separate the main sound source signal from the frequency domain signals; and (B4) converting the main sound source signal into time domain signal.

10. The audio processing method of claim 7, wherein the noise is a signal in a starting time period of the main sound source signal.

11. The audio processing method of claim 7, further comprising, after step (C2), the steps of:

(C3) determining whether each amplitude in the noise reduction signal is smaller than a maximum amplitude value of the noise and, if yes, replacing the determined amplitude in the noise reduction signal with a minimum one of the three amplitudes corresponding to frequency associated with the determined amplitude and frequencies adjacent thereto.

12. The audio processing method of claim 7, further comprising, after step (C2), the steps of:

(C3) determining whether an amplitude ratio of the noise reduction signal to the noise is smaller than a predetermined value and, if yes, attenuating the main sound source signal.

* * * * *